UNITED STATES PATENT OFFICE.

HENRY BERNSTEIN, OF PHILADELPHIA, PENNSYLVANIA.

MANUFACTURE OF ARTIFICIAL SILK.

SPECIFICATION forming part of Letters Patent No. 712,756, dated November 4, 1902.

Application filed June 26, 1902. Serial No. 113,215. (Specimens.)

*To all whom it may concern:*

Be it known that I, HENRY BERNSTEIN, a citizen of the United States, residing in the city and county of Philadelphia, State of Pennsylvania, have invented a new and useful Improvement in the Manufacture of Artificial Silk, of which the following is a specification.

My invention consists of a novel process of manufacturing artificial silk, the same embodying the employment of gelatin or a substance of gelatinous nature and the utilization of the liquor resulting from the treatment or boiling of raw silk.

In carrying out my invention I take, say, six and one-half parts of gelatin and three parts of the liquor resulting from boiling and otherwise treating raw silk. These in cold condition are placed in a suitable tank for two hours, more or less, and stirred, so as to be thoroughly mixed. The resultant body is then introduced into another vessel and subjected to heat of about 120° Fahrenheit for an hour or so, after which the mass is placed in an air-tight vessel provided with nozzles or orifices and subjected to pressure, whereby said mass is forced through the nozzles or orifices in the form of filaments, which, drying rapidly, are twisted into threads and wound on bobbins or otherwise formed into skeins. These are now subjected to the vapor of formaldehyde in order to render the material insoluble, after which it is ready for use, and, if desired, it may be dyed in any suitable color.

It will be seen that the article produced is of superior nature, it being strong, pliable, elastic, and lustrous and having a highly-silky appearance without possessing an unnatural gloss or woody feeling, and it will not shrink or shrivel due to moisture or changes in temperature.

I have found that in the liquor, as aforesaid, there is a natural gum or substance, which existing in the raw silk is removed in the boiling thereof, said gum or substance readily combining with the gelatin and assisting in producing the material stated. Furthermore, in said boiling soap is used. Whatever of this remains in the liquor and unites with the other ingredients serves to add pliability to the article produced.

I do not limit myself to the production of a material which I denominate "artificial silk," as the same may be an imitation of horsehair, in which case the threads are made heavier than those for artificial silk.

Having thus described my invention, what I claim as new, and desire to secure by Letters Patent, is—

1. In the process of manufacturing artificial silk, the utilization of the liquor resulting from boiling raw silk by the extraction therefrom of the natural gum in said raw silk, and the combination with the same of a material which forms a body therewith.

2. Artificial silk composed of a liquor resulting from boiling raw silk, and a material forming a body therewith.

3. A process of manufacturing artificial silk, consisting in combining gelatin and the liquor resulting from boiling raw silk, heating the compound, forming the same into filaments and twisting the latter into threads.

4. A process of manufacturing artificial silk, consisting in combining gelatin and the liquor resulting from boiling raw silk, heating the compound, forming the same into filaments, twisting the latter into threads, and subjecting said threads to a vapor of formaldehyde to render them insoluble.

5. Artificial silk formed of gelatin and the liquor resulting from boiling raw silk.

HENRY BERNSTEIN.

Witnesses:
  JOHN A. WIEDERSHEIM,
  WM. CANER WIEDERSHEIM.